March 21, 1950  J. P. HUME  2,501,055
PROJECTOR ADAPTER
Filed April 3, 1946
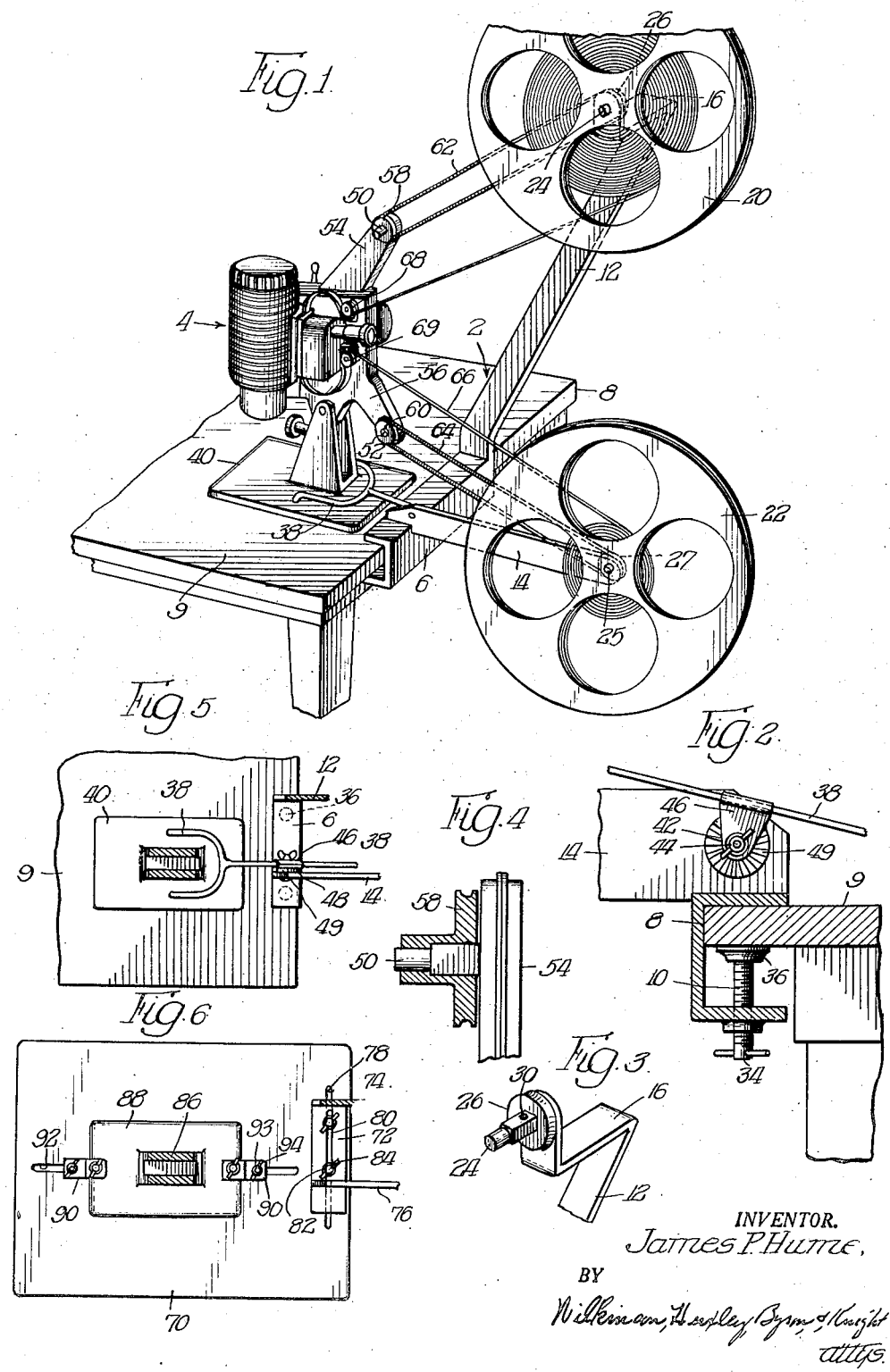
INVENTOR.
James P. Hume,
BY
Wilkinson, Huxley, Byron & Knight
Attys.

Patented Mar. 21, 1950

2,501,055

UNITED STATES PATENT OFFICE 2,501,055

PROJECTOR ADAPTER

James P. Hume, Chicago, Ill.

Application April 3, 1946, Serial No. 659,339

9 Claims. (Cl. 242—55)

This invention relates to an adapter for a picture projector of the type employing reel-wound film.

Normally the use of reels of a larger size than that with which the projector was designed to be used is not possible. The main factor operating to prohibit this use of the projector is the spacial relation of the reel supporting means with the remaining parts of the projector, the projected beam of light, and the supporting surface used.

This limitation reduces the selection of films that may be shown with a particular projector, since the same subject-matter is not always provided in all the standard reel sizes.

It is also desirable to be able to use reels of a large size, since the number of reel changes required to show a particular length of film can be greatly reduced. Such reel changes are obviously an undesirable interruption in the projection of a particular length of film.

It is therefore an object of this invention to provide a device which, when used with such a projector, permits the use of reels which have too large a diameter to be normally used with the projector.

It is a further object of this invention to provide a new and improved construction for such an adapter, which lends itself to simple and inexpensive manufacturing operations.

It is a further object of this invention to provide an adapter simple in both design and operation, so that it can be quickly installed and readily operated by anyone using a projector, without the need for detailed instruction.

It is a further object of this invention to provide an adapter which has a minimum number of moving parts, and requires no alteration of the projector to permit it to be utilized therewith.

It is a further object of this invention to provide an adapter which derives its reel-driving power for the reels supported by it from the projector itself.

It is a further object of this invention to provide an adapter which can be completely installed, except for the removable driving means without interfering with the normal use of the projector if desired.

It is a further object of this invention to provide an adapter which, when installed, can be made operable almost immediately by merely applying removable drive pulleys on the spindles normally used for the reels themselves, and connecting said drive pulleys to the pulleys of the adapter.

It is a further object of this invention to provide an adapter which can be utilized when the surface used to support the projector is a table top or any other similar object.

It is a further object of this invention to provide an adapter which readily lends itself to portability, being light in weight and simple in construction.

Other objects not specifically enumerated are contemplated for this invention, as will readily appear to one skilled in the art as the following description proceeds.

In the drawings—

Fig. 1 is an elevated view of one form of adapter constructed in accordance with this invention, being shown in operable relation to a projector and a supporting means.

Fig. 2 is a fragmentary elevation, partly in section, of the base portion of the adapter, showing the clamping means in more detail.

Fig. 3 is a perspective view of the shaft and drive wheel combination associated with each supporting arm.

Fig. 4 is an elevation, partly in section, showing one of the removable drive wheels which replace the reels on the projector reel-carrying shaft, when the adapter is in operation.

Fig. 5 is a fragmentary top plan view, partly in section, of the adapter and projector shown in Fig. 1; and Fig. 6 is an elevational view of a modified form of the adapter disclosing an alternative form of the base portion and clamping means.

Referring now to Figs. 1 and 2, it will be noted that the adapter 2 here illustrated has a base portion 6, having a cross-sectional U-shape, enabling it to be slipped over the edge 8 of the surface 9 supporting the projector. The clamping means 10 operates to securely clamp the base portion 6 to the edge 8 of the supporting surface 9 after it has been slipped into engagement with that edge.

Extending from the base portion 6 are the two reel-supporting arms 12 and 14. Arm 12 extends upwardly from one end of the base portion 6 and has the laterally displaced section 16. Arm 14 extends outwardly from a point near the opposite end of the base portion 6 and is substantially in the same horizontal plane as that of the base portion.

The length and angular disposition of these two arms is such that there will be no interference between reels 20 and 22 supported by them, and the base portion of the adapter, the projector, or the projected beam of light. These clearances can be made such that reels of the largest diameter in commercial use may be used on the adapter without interference with any of the above-named objects. The two arms are also so disposed that the reels 20 and 22 will be supported by the arms 12 and 14, respectively, in the same vertical plane.

As shown in Figs. 1 and 3, arms 12 and 14 have rotatably mounted at their outer extremities the shafts 24 and 25 projecting from those arms and substantially parallel to the base portion 6. Both of these shafts project in the same direction from their respective arms, and fixed to these shafts, adjacent to the supporting arms, are the drive wheels 26 and 27. The portions of the shafts 24 and 25 extending away from their respective supporting arms beyond the drive wheels 26 and 27 each have, as an integral part thereof, the flexible holding means 30 for removably engaging a reel slipped onto the shaft through its center opening normally provided therefor.

As shown in Fig. 2, the base portion 6 includes the clamping means 10 which is made up of the adjustable wing bolts 34 and the flat clamping portion 36 cooperating with those wing bolts. This arrangement allows the adapter to be securely clamped to supporting surfaces of a variety of thicknesses. The arm 38 is used to clamp the base 40 of the projector to the supporting surface and to keep the projector 4 in fixed, spaced relation to the adapter 2. The arm 38 can be fixed in any position of horizontal or vertical adjustment by tightening the clamping device 42. This device is made up of the wing bolt 44 which threads into the base of the arm 14 and tightens the washers 46 and 48 which grip the arm 38 and are held against the serrated surface 49, thus holding arm 38 in any desired position.

As shown in Figs. 1 and 4, when the adapter is used with the projector, the shafts 50 and 52 on the reel-carrying arms 54 and 56 of the projector that normally carry the reels used with the projector, are provided with removable drive wheels 58 and 60, in place of the normally used reels. The coil spring driving belts 62 and 64 are then placed in driving engagement with the drive wheels 58 and 26 and 60 and 27, respectively.

When the projector and adapter are properly positioned with respect to each other and to the supporting surface 8, and the coil spring belts 62 and 64 are placed as described above, the shafts 24 and 25 are rotated in exactly the same manner as are the shafts 50 and 52, respectively. Consequently, reels carried by the former shafts will rotate in exactly the same manner as they would if carried by the latter shafts.

As stated before, arms 12 and 14 are so disposed that reels 20 and 22 are held in the same vertical plane. In addition, the adapter may be positioned with respect to the projector so that the reels 20 and 22 are substantially in the same vertical plane that the reels supported by the projector arms 54 and 56 would be in, when the projector alone is being used. In this position, the drive wheels 26, 27, 58 and 60 are also all in substantially the same vertical plane.

Therefore, if the film 66 is fed into the feeding mechanism 68 of the projector from reel 20 rotating in the normal manner, and if the film 66 is fed from the feeding mechanism 69 onto reel 22 rotating in the normal manner, the film will run through the projector substantially in the same way that it does when no adapter is used.

The fact that the film 66 travels a greater distance from reel 20 to the feeding mechanism 68 and from the feeding mechanism 69 to reel 22 than it travels from and to the normal reels, when the projector alone is used, will have no effect on the operation of the projector. This is true because there is no impediment offered to the free travel of the film by any portion of the adapter when properly positioned with respect to the projector.

Fig. 6 shows a modified form of the adapter having a base plate 70 to which can be removably attached the base portion 72 of the two supporting arms 74 and 76. The base plate 70 and the base portion 72 have the slots 78 and 80, respectively, through which the bolts 82 extend. The base portion 72 can be secured to the base plate 70 by tightening the wing nuts 84 on the bolts 82 when the arms are properly aligned with the projector 86. The projector base 88 can be secured to the base plate 70 by the clamps 90 which ride in the slot 92 on the bolts 93 and can be secured in any position in that slot by tightening the wing nuts 94 on the bolts 93.

This form of the invention allows the adapter to be used when the supporting surface does not have the type of edge required by the form shown in Figs. 1 and 2.

The drawings and the above discussion are not intended to represent the only possible forms of this invention, in regard to details of construction. Changes in form and in the proportion of parts, as well as the substitution of equivalents, are contemplated as circumstances may suggest or render expedient, without departing from the spirit or scope of the invention.

What is claimed is:

1. An adapter for film projectors, comprising a base portion, clamping means associated with said base portion holding the adapter in fixed relation to the surface supporting a projector and holding said projector in fixed relation to said surface, arms extending from said base portion, rotatable shafts associated with said arms removably engaging reels of film, drive wheels associated with said shafts, and means for rotating said drive wheels and shafts removably associated with said drive wheels and connecting said drive wheels to additional drive wheels removably engaged with reel-supporting shafts of said projector.

2. An adapter for film projectors, comprising a base portion, clamping means associated with said base portion holding the adapter in fixed relation to the surface supporting a projector and holding said projector in fixed relation to said surface, arms extending from said base portion, rotatable shafts associated with said arms removably engaging reels of film, drive wheels associated with said shafts, and means for rotating said drive wheels and shafts removably associated with said drive wheels and connecting said drive wheels to additional drive wheels removably engaged with reel-supporting shafts of said projector, said adapter arms, rotatable shafts and first-mentioned drive wheels being so disposed that said adapter may be clamped in a position relative to said projector such that said rotatable shafts and first-mentioned drive wheels are in substantially the same vertical plane as said reel-supporting shafts of said projector and said additional drive wheels.

3. An adapter for film projectors, comprising a base portion, clamping means associated with said base portion holding the adapter in fixed relation to the surface supporting a projector and holding said projector in fixed relation to said surface, arms extending from said base portion, rotatable shafts associated with said arms removably engaging reels of film, drive wheels associated with said shafts, and means for rotating said drive wheels and shafts removably associated with said drive wheels and connecting said drive wheels to additional drive wheels removably engaged with reel-supporting shafts of said projector, said adapter arms, rotatable shafts and first-mentioned drive wheels being so disposed that said adapter may be clamped in a position relative to said projector such that said rotatable shafts and first-mentioned drive wheels are in substantially the same vertical plane as said reel-supporting shafts of said projector and said additional drive wheels, the said adapter arms and their associated rotatable shafts being so disposed that the distance between the said rotatable shafts is greater than the distance between the said reel-supporting shafts.

4. An adapter for film projectors of the type having reel-supporting means, film feeding mechanism and means for actuating said film feeding mechanism, comprising a support, a pair of arms mounted on said support each having reel-holding spindles mounted thereon, said arms being so disposed as to position the reels mounted on the spindles thereof in spaced relation, drive means mounted on each of said spindles and serving when driven to impart rotary movement thereto, means for holding a picture projector of the above-identified type in a fixed and predetermined association with said support, said means for holding said projector serving to maintain said projector and said arms in such relative position that said drive means is adapted to be driven by the reel-supporting mechanism of said projector and the reels on said arms and said arms are maintained free from said projector and the beam of light projected thereby, driving means for said drive means, and means mounted on the reel-supporting means of said projector for rotating said driving means.

5. An adapter for film projectors of the type having reel-supporting means, film feeding mechanism and means for actuating said film feeding mechanism, comprising a support, a pair of arms mounted on said support each having reel-holding spindles mounted thereon, said arms being so disposed as to position the reels mounted on the spindles thereof in spaced relation and in substantially the same vertical plane, drive means mounted on each of said spindles and serving when driven to impart rotary movement thereto, means for holding a picture projector of the above-identified type in a fixed and predetermined association with said support, said means for holding said projector serving to maintain said projector and said arms in such relative position that said drive means is adapted to be driven by the reel-supporting mechanism of said projector and the reels on said arms and said arms are maintained free from said projector and the beam of light projected thereby, driving means for said drive means, and means mounted on the reel-supporting means of said projector for rotating said driving means.

6. An adapter for use with a film projector of the type having means for projecting a beam of light, film feeding mechanism, a projector reel spindle, and means for driving said projector reel spindle, said adapter comprising an arm, an adapter spindle on said arm constructed and mounted to accommodate and rotate a film reel, driving means for said adapter spindle, and means for mounting said arm in a fixed and predetermined relationship with respect to said projector and in a position wherein said driving means may be connected between said adapter spindle and said means for driving said projector reel spindle whereby the former may be driven by the latter, said arm when fixed in said predetermined position being so disposed as to maintain the reel mounted thereon out of the path of the beam of light projected by said projector.

7. An adapter for use with a film projector of the type having means for projecting a beam of light, film feeding mechanism, a pair of projector reel spindles, and means for driving said projector reel spindles, said adapter comprising a pair of arms, an adapter spindle on each of said arms each constructed and mounted to accommodate and rotate a film reel, driving means for each of said adapter spindles, and means for mounting said arms in a fixed and predetermined relationship with respect to said projector and in a position wherein said driving means may be connected, respectively, between said adapter spindles and said means for driving said projector reel spindles whereby the former may be driven by the latter, said arms when fixed in said predetermined position being so disposed as to maintain the reels mounted thereon, respectively, out of the path of the beam of light projected by said projector.

8. An adapter of the character defined in claim 6, further characterized in that said arm is mounted with respect to said projector in a manner to dispose a portion of the reel mounted thereon below the surface on which said projector is mounted.

9. An adapter of the character defined in claim 6, further characterized in that the arm is mounted in a substantially horizontal position so as to dispose a film reel thereon beyond the edge of a supporting surface for said projector and with a portion of the reel projecting below the plane of said surface.

JAMES P. HUME

REFERENCES CITED

The following references are of record in the file of this patent:

UNITED STATES PATENTS

| Number | Name | Date |
| --- | --- | --- |
| 2,256,899 | Greenwood | Sept. 23, 1941 |